US012706408B2

(12) United States Patent
Wang et al.

(10) Patent No.: US 12,706,408 B2
(45) Date of Patent: Aug. 11, 2026

(54) CONNECTOR HAVING A TERMINAL LOCKING STRUCTURE

(71) Applicants: Tyco Electronics (Shanghai) Co., Ltd., Shanghai (CN); TE Connectivity Services GmbH, Schaffhausen (CH); TE Connectivity Italia Distribution S.r.l., Turin (IT)

(72) Inventors: Yongjia (Winter) Wang, Shanghai (CN); Liang Zhang, Shanghai (CN); Subhash Maheshbabu, Bangalore (IN); Federico Lupo, Turin (IT); Hongbo (Daniel) Zhang, Shanghai (CN)

(73) Assignees: Tyco Electronics (Shanghai) Co., Ltd., Shanghai (CN); TE Connectivity Solutions GmbH, Schaffhausen (CH); TE Connectivity Italia Distribution S.R.L., Turin (IT)

( * ) Notice: Subject to any disclaimer, the term of this patent is extended or adjusted under 35 U.S.C. 154(b) by 428 days.

(21) Appl. No.: 17/974,031

(22) Filed: Oct. 26, 2022

(65) Prior Publication Data

US 2023/0131397 A1 Apr. 27, 2023

(30) Foreign Application Priority Data

Oct. 26, 2021 (CN) ........................ 202122578639.6

(51) Int. Cl.
*H01R 13/422* (2006.01)

(52) U.S. Cl.
CPC ................................ *H01R 13/4223* (2013.01)

(58) Field of Classification Search
CPC .. H01R 13/4223; H01R 13/113; H01R 13/114
USPC .......................................................... 439/595
See application file for complete search history.

(56) References Cited

U.S. PATENT DOCUMENTS 4,565,416 A * 1/1986 Rudy ................ H01R 13/4364 439/600
4,900,271 A * 2/1990 Colleran ............. H01R 13/113 439/856
4,902,247 A * 2/1990 Suzuki .............. H01R 13/5221 439/598
4,944,696 A * 7/1990 Sueyoshi .......... H01R 13/4364 439/598

(Continued)

FOREIGN PATENT DOCUMENTS

JP H09213398 A * 8/1997
JP 2015035395 A * 2/2015

*Primary Examiner* — Marcus E Harcum
(74) *Attorney, Agent, or Firm* — Barley Snyder

(57) ABSTRACT

A connector includes a housing having a latch and a terminal mounted in the housing. The terminal has a locking hole with a locking hole front portion in a terminal insertion direction along which the terminal is inserted into the housing and a locking hole rear portion in the terminal insertion direction. A size of the locking hole front portion is larger than a size of the locking hole rear portion. The latch elastically protrudes into the locking hole to lock the terminal in the housing. The latch has a latch front portion in the terminal insertion direction and a latch rear portion in the terminal insertion direction. A size of the latch front portion is larger than a size of the latch rear portion. The size of the latch rear portion is smaller than the size of the locking hole front portion.

18 Claims, 4 Drawing Sheets

(56) References Cited

U.S. PATENT DOCUMENTS

| | | | | |
|---|---|---|---|---|
| 5,088,938 | A * | 2/1992 | Murakami | H01R 13/4365 439/595 |
| 7,004,790 | B2 * | 2/2006 | Martin | H01R 13/4223 439/595 |
| 7,074,066 | B2 * | 7/2006 | Pepe | H01R 13/5219 439/321 |
| 7,867,029 | B2 * | 1/2011 | Takahashi | H01R 13/4223 439/595 |
| 8,845,362 | B2 * | 9/2014 | Chikusa | H01R 13/6275 439/595 |
| 9,509,077 | B2 * | 11/2016 | Lihoshi | H01R 13/4223 |
| 9,716,341 | B2 * | 7/2017 | Yamane | H01R 13/62938 |
| 2015/0222039 | A1 * | 8/2015 | Akiguchi | H01R 13/41 439/746 |
| 2016/0072212 | A1 * | 3/2016 | Shindo | H01R 13/4362 439/744 |
| 2016/0190724 | A1 * | 6/2016 | Mito | H01R 13/4223 439/746 |
| 2018/0351279 | A1 * | 12/2018 | Nagasaka | H01R 13/4223 |
| 2019/0267725 | A1 * | 8/2019 | Zhang | H01R 13/432 |
| 2020/0303858 | A1 * | 9/2020 | Inoue | H01R 13/4223 |
| 2021/0098917 | A1 * | 4/2021 | Teramoto | H01R 13/629 |
| 2021/0175653 | A1 * | 6/2021 | Sugimoto | H01R 13/533 |
| 2021/0288427 | A1 * | 9/2021 | Ikeda | H01R 13/11 |
| 2022/0069505 | A1 * | 3/2022 | Yonezu | H01R 13/4223 |
| 2023/0006389 | A1 * | 1/2023 | Matsuura | H01R 13/111 |
| 2023/0118800 | A1 * | 4/2023 | Nakano | H01R 13/6215 439/352 |
| 2023/0261422 | A1 * | 8/2023 | Maesoba | H01R 13/65915 439/607.01 |
| 2023/0318218 | A1 * | 10/2023 | Enomoto | H01R 13/639 439/660 |
| 2023/0361498 | A1 * | 11/2023 | Saito | H01R 24/40 |

* cited by examiner

CONNECTOR HAVING A TERMINAL LOCKING STRUCTURE

CROSS-REFERENCE TO RELATED APPLICATION

This application claims the benefit of the filing date under 35 U.S.C. § 119(a)-(d) of Chinese Patent Application No. 202122578639.6, filed on Oct. 26, 2021.

FIELD OF THE INVENTION

The present disclosure relates to a connector, and more particularly, to a connector with a terminal locking structure.

BACKGROUND

A connector generally includes a housing and a terminal; the terminal is mounted and locked in the housing by a certain locking structure. The existing locking structure usually includes a hole formed in the terminal and an elastic arm formed in the housing, and the elastic arm is provided with a latch. When the terminal is inserted into the housing, the latch will fit with the hole of the terminal, for example, the latch will protrude into the hole of the terminal, thus locking the terminal in the housing.

In the existing connector, the latch and the hole of the terminal in the locking structure are usually rectangular or other regular shapes, so if there is a slight offset between the terminal and the housing, the latch may not be able to protrude and fit into the hole, resulting in difficulty of locking the terminal in the housing. In addition, a bending line is usually left on the terminal in order to bend a semi-finished terminal along the bending line to form a finished terminal during the manufacture of the terminal. The existing rectangular or other regularly shaped hole occupies a large area of material, especially when the terminal is small. The hole is very close to the bend line, which leaves relatively less material available for bending of the semi-finished terminal, making it difficult to bend the semi-finished terminal, and in turn making the terminal not well-manufactured.

SUMMARY

A connector includes a housing having a latch and a terminal mounted in the housing. The terminal has a locking hole with a locking hole front portion in a terminal insertion direction along which the terminal is inserted into the housing and a locking hole rear portion in the terminal insertion direction. A size of the locking hole front portion is larger than a size of the locking hole rear portion. The latch elastically protrudes into the locking hole to lock the terminal in the housing. The latch has a latch front portion in the terminal insertion direction and a latch rear portion in the terminal insertion direction. A size of the latch front portion is larger than a size of the latch rear portion. The size of the latch rear portion is smaller than the size of the locking hole front portion.

BRIEF DESCRIPTION OF THE DRAWINGS

The features of the present invention will become more apparent by describing in detail exemplary embodiments thereof with reference to the accompanying drawings, in which.

DETAILED DESCRIPTION OF THE EMBODIMENTS

In order to illustrate the technical solutions and advantages of the present disclosure more clearly, the embodiments of the present disclosure will be described in detail below with reference to the corresponding drawings. It should be understood that the following description of the embodiments is intended to explain and illustrate the general concept of the present disclosure, and should not be construed as limiting the present disclosure. In the specification and drawings, the same or similar reference numbers refer to the same or similar parts or components. For the purpose of clarity, the drawings are not necessarily to scale and some well-known components and structures may be omitted from the drawings.

Unless otherwise defined, technical or scientific terms used in the present disclosure shall have the ordinary meanings understood by those with ordinary skill in the art to which the present disclosure belongs. The word "a" or "an" used in this disclosure does not exclude a plurality, and the word "include", "include" or the like means that the elements or items appearing before the word cover the elements or items and their equivalents listed after the word, without excluding other elements or items. The word "connect", "couple" or the like are not limited to physical or mechanical connections, but may include electrical connections, regardless of direct or indirect. "up", "down", "left", "right", "top" or "bottom" are only used to indicate relative positional relationship. When the absolute position of the described object changes, its relative positional relationship may also change correspondingly. When an element is referred to as being "above" or "below" another element, it can be directly "above" or "below" the other element, or else, intervening elements may be present.

Figure 7:
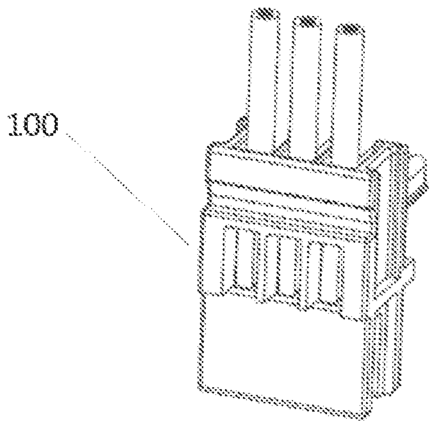
FIG. 7 is a perspective view of the connector after assembly.

A connector 100 according to an embodiment is shown in FIG. 7. The connector 100 includes a housing 1 and a terminal 2 mounted in the housing 1. The terminal 2 includes a locking hole 21, as shown in FIGS. 3 and 4.

Figure 1:
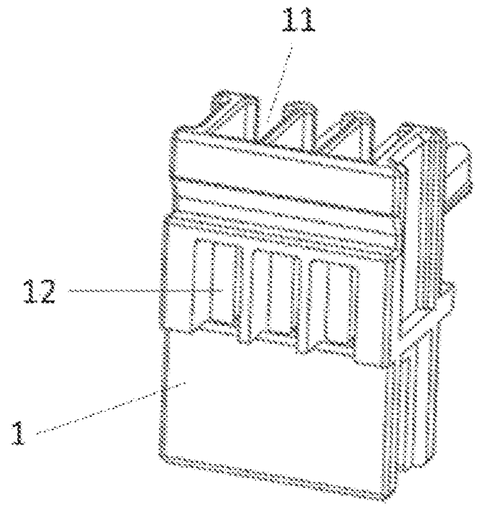
FIG. 1 is a perspective view of a housing of a connector according to an embodiment.
Figure 2:
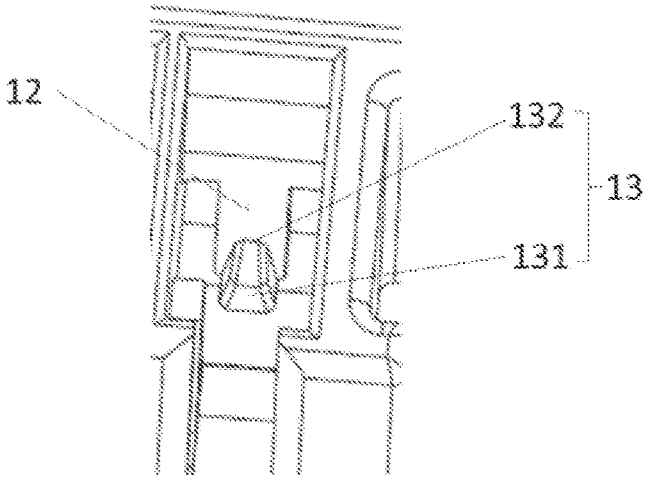
FIG. 2 is a detail perspective view of an elastic arm and a latch according to an embodiment.
Figure 6:
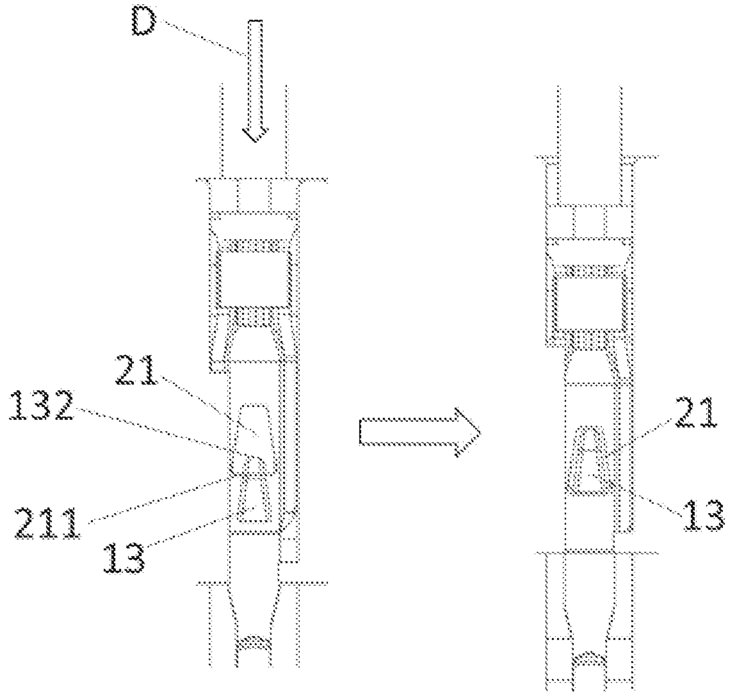
FIG. 6 is a schematic diagram of a process of inserting the terminal into the housing.

A latch 13, shown in FIGS. 2 and 6, is provided in the housing 1, and the latch 13 elastically protrudes into the locking hole 21 to lock the terminal 2 in the housing 1, specifically to lock the terminal 2 in an accommodating portion 11 of the housing 1 shown in FIG. 1. In this embodiment, there may be a plurality of terminals 2 arranged in a row, and correspondingly, the housing 1 may include a plurality of accommodating portions 11 each for accommodating one terminal 2.

As shown in FIGS. 1 and 2, an elastic arm 12 is formed on an inner wall of the housing 1. In the shown embodiment, one elastic arm 12 is formed on an inner wall of a corresponding one of the accommodating portions 11. The latch 13 is formed on the corresponding elastic arm 12, in this way, the latch 13 can protrude into the locking hole 21 by an elastic force applied to the latch 13 from the elastic arm 12 during the process of inserting the terminal 2 into the accommodating portion 11 of the housing 1, so as to realize the locking of the terminal 2 in the accommodating portion 11 of the housing 1.

Figure 3:
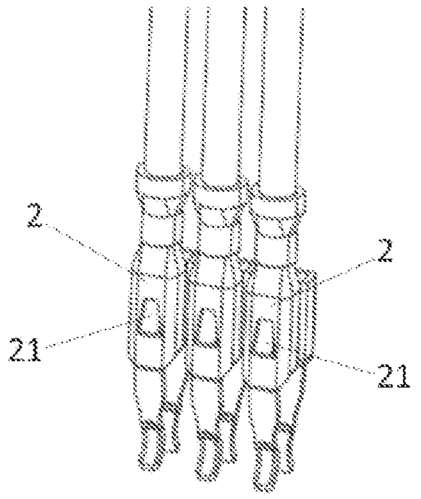
FIG. 3 is a perspective view of a plurality of terminals of the connector.
Figure 4:
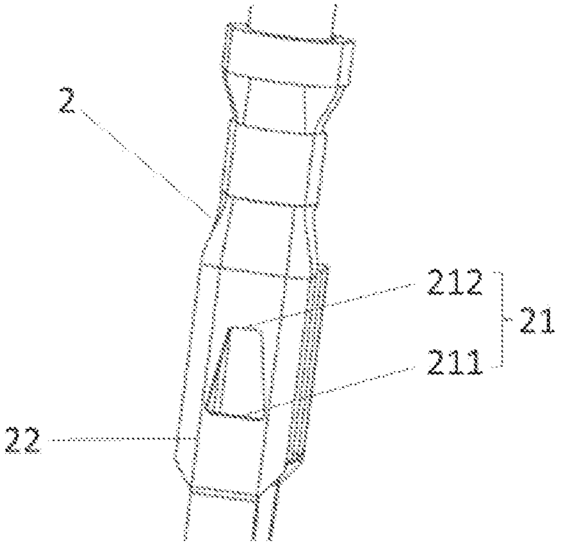
FIG. 4 is a detail perspective view of a locking hole of one of the terminals.

As shown in FIGS. 3 and 4, the locking hole 21 includes a locking hole front portion 211 in a terminal insertion direction D (as shown in FIG. 6) along which the terminal 2 is inserted into the housing 1 and a locking hole rear portion 212 in the terminal insertion direction D. A size of the locking hole front portion 211 is larger than that of the locking hole rear portion 212. For example, a size of the locking hole 21 gradually increases from the locking hole rear portion 212 to the locking hole front portion 211 in the terminal insertion direction D.

As shown in FIG. 2, the latch 13 includes a latch front portion 131 in the terminal insertion direction D and a latch rear portion 132 in the terminal insertion direction D, a size of the latch front portion 131 is larger than that of the latch rear portion 132. For example, a size of the latch 13 gradually increases from the latch rear portion 132 to the latch front portion 131 in the terminal insertion direction D.

FIG. 6 shows a process of inserting the terminal 2 into the housing 1. Referring to FIG. 6, the size of the latch rear portion 132 of the latch 13 is smaller than that of the locking hole front portion 211 of the locking hole 21. The smaller latch rear portion 132 easily fits with the larger locking hole front portion 211, in this way, the smaller latch rear portion 132 of the latch 13 firstly meets and fits with the larger locking hole front portion 211 of the locking hole 21 during insertion of the terminal 2 into the accommodating portion 11 of the housing 1 in the terminal insertion direction D for example, from top to bottom. As a result, there is little or no adverse effect on the fitting between the latch 13 and the locking hole 21 even if there is a small offset between the terminal 2 and the housing 1, which eases the smooth fitting of the latch 13 into the locking hole 21 of the terminal 2 and thereby achieves the locking to the terminal 20. In other words, during insertion of the terminal 2 into the accommodating portion 11 of the housing 1 from top to bottom, the upper portion (namely the smaller latch rear portion 132) of the latch 13 is pre-aligned with the lower portion as well as the locking hole front portion 211 of the locking hole 21. Here, the former is relatively small while the latter is relatively large, which helps the smooth fitting of the latch 13 into the locking hole 21 so as to ensure that the terminal 2 is smoothly and accurately locked into the accommodating portion 11 of the housing 1.

In order to make the locking of the terminal 2 in the accommodating portion 11 more firm, that is, to increase the firmness of the terminal 2 in the accommodating portion 11, the locking hole 21 and the latch 13 in this embodiment are well matched in shape, for example the shape of the locking hole 21 and that of the latch 13 are basically the same. In an example, the shape of the locking hole 21 and the shape of the latch 13 are both trapezoidal shapes; the size of the locking hole rear portion 212 of the locking hole 21 is slightly larger than that of the latch rear portion 132 of the latch 13, and the size of the locking hole front portion 211 of the locking hole 21 is also slightly larger than that of the latch front portion 131 of the latch 13, as shown in FIG. 6.

Figure 5:
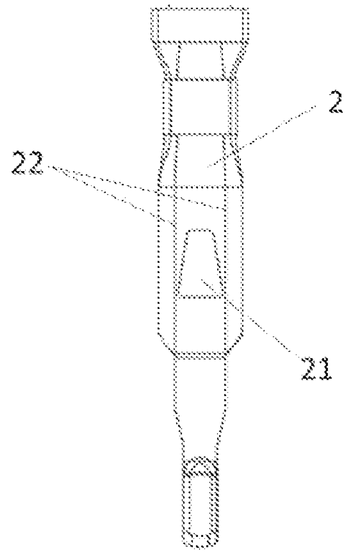
FIG. 5 is a plan view of a bending line of one of the terminals.
Figure 8:
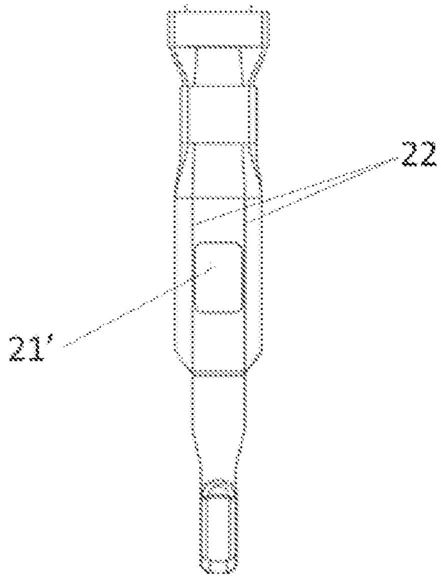
FIG. 8 is a plan view of a locking hole of a terminal according to the prior art.

In addition, as shown in FIGS. 4 and 5, the locking hole 21 of the terminal 2 is arranged in a size with a small upper portion, namely, the locking hole rear portion 212, and a large lower portion, namely, the locking hole front portion 211. As a result, compared with a traditional rectangular locking hole 21' as shown in FIG. 8, the locking hole 21, especially, the locking hole rear portion 212, in this embodiment can be farther away from the bending line 22 on the terminal 2, which leaves more material in the bending area of the terminal 2 available for bending. Therefore, the bending of the semi-finished terminal 2 in the bending area can be made easier during the manufacturing process of the terminal 2, thereby making it easier and better to manufacture the finished terminal 2.

It could be appreciated by those skilled in the art that the embodiments described above are all exemplary and can be improved by those skilled in the art, and the structures described in the various embodiments can be freely combined unless they conflict in terms of structure or principle.

Although the present disclosure has been described with reference to the accompanying drawings, the embodiments disclosed in the accompanying drawings are intended to illustrate the embodiments of the present disclosure and should not be construed as a limitation of the present disclosure. The dimension ratios in the drawings are only schematic, and should not be construed as limiting the present disclosure.

Those skilled in the art should understand that any changes and improvements made without departing from the general concept of the present disclosure are within the scope of the present disclosure. The protection scope of the present disclosure shall be subject to the scope defined by the claims of the present application.

What is claimed is:

1. A connector, comprising:

a housing having a latch; and a terminal mounted in the housing, the terminal having a locking hole extending through a portion of the terminal and surrounded by a material of the terminal, the locking hole has a locking hole front portion in a terminal insertion direction along which the terminal is inserted into the housing and a locking hole rear portion in the terminal insertion direction, a size of the locking hole front portion is larger than a size of the locking hole rear portion, the locking hole front portion is an end of the locking hole and the locking hole rear portion is another end of the locking hole, the locking hole tapers from the locking hole front portion to the locking hole rear portion, the latch elastically protrudes into the locking hole to lock the terminal in the housing, the latch has a latch front portion in the terminal insertion direction and a latch rear portion in the terminal insertion direction, a size of the latch front portion is larger than a size of the latch rear portion, the size of the latch rear portion is smaller than the size of the locking hole front portion.

2. The connector of claim 1, wherein a size of the locking hole increases from the locking hole rear portion to the locking hole front portion in the terminal insertion direction.

3. The connector of claim 1, wherein a size of the latch increases from the latch rear portion to the latch front portion in the terminal insertion direction.

4. The connector of claim 1, wherein the housing has an elastic arm on an inner wall.

5. The connector of claim 4, wherein the latch is formed on the elastic arm.

6. The connector of claim 5, wherein the latch protrudes into the locking hole by an elastic force of the elastic arm.

7. The connector of claim 6, wherein the housing has an accommodating portion receiving the terminal.

8. The connector of claim 7, wherein the elastic arm is formed on the inner wall of the accommodating portion.

9. The connector of claim 1, wherein the locking hole has a same shape as the latch.

10. The connector of claim 9, wherein the locking hole and the latch each have a trapezoidal shape.

11. The connector of claim 1, wherein the terminal is one of a plurality of terminals mounted in the housing.

12. The connector of claim 1, wherein the locking hole continuously tapers from the locking hole front portion to the locking hole rear portion.

13. The connector of claim 1, wherein the locking hole front portion is opposite the locking hole rear portion.

14. The connector of claim 1, wherein the locking hole front portion is set apart from the locking hole rear portion.

15. The connector of claim 1, wherein the locking hole tapers along an entire length of the locking hole from the locking hole front portion to the locking hole rear portion.

16. The connector of claim 1, wherein the material of the terminal surrounding the locking hole defines the locking hole.

17. A connector, comprising:

a housing having a latch; and a terminal mounted in the housing, the terminal having a locking hole with a locking hole front portion in a terminal insertion direction along which the terminal is inserted into the housing and a locking hole rear portion in the terminal insertion direction, a size of the locking hole front portion is larger than a size of the locking hole rear portion, the locking hole front portion is an end of the locking hole and the locking hole rear portion is another end of the locking hole, the locking hole tapers from the locking hole front portion to the locking hole rear portion, the latch elastically protrudes into the locking hole to lock the terminal in the housing, the latch has a latch front portion in the terminal insertion direction and a latch rear portion in the terminal insertion direction, a size of the latch front portion is larger than a size of the latch rear portion, the size of the latch rear portion is smaller than the size of the locking hole front portion.

18. The connector of claim 16, wherein an outside portion of the material of the terminal surrounding the locking hole is on an outside of the terminal, a pair of sides of the outside portion is between the locking hole front portion and the locking hole rear portion, each side tapers from the locking hole front portion to the locking hole rear portion.

* * * * *